(12) United States Patent
Raszkowski et al.

(10) Patent No.: US 12,247,658 B2
(45) Date of Patent: Mar. 11, 2025

(54) ELECTRIC PARK SYSTEMS, TRANSMISSIONS INCORPORATING THE SAME, AND METHODS FOR TRANSMISSIONS

(71) Applicant: ALLISON TRANSMISSION, INC., Indianapolis, IN (US)

(72) Inventors: James Raszkowski, Indianapolis, IN (US); Isaac Mock, Martinsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 72 days.

(21) Appl. No.: 17/954,942

(22) Filed: Sep. 28, 2022

(65) Prior Publication Data

US 2024/0102555 A1  Mar. 28, 2024

(51) Int. Cl.
F16H 63/34  (2006.01)
(52) U.S. Cl.
CPC ..... F16H 63/3466 (2013.01); F16H 63/3425 (2013.01)
(58) Field of Classification Search
CPC ............. F16H 63/3425; F16H 63/3466; F16H 63/3491; F16H 63/3416
See application file for complete search history.

(56) References Cited

U.S. PATENT DOCUMENTS

| 6,752,036 | B2* | 6/2004 | Kropp | F16H 63/3491 74/473.26 |
|---|---|---|---|---|
| 7,284,648 | B2 | 10/2007 | Reed et al. | |
| 10,107,396 | B2* | 10/2018 | Hofkirchner | F16H 63/3466 |
| 10,443,723 | B2 | 10/2019 | Bormann | |
| 10,648,560 | B2 | 5/2020 | Kokubu et al. | |
| 11,261,967 | B2 | 3/2022 | Wiesner et al. | |
| 11,273,802 | B2 | 3/2022 | Hanker et al. | |
| 2006/0185459 | A1 | 8/2006 | Matsumura et al. | |
| 2020/0248806 | A1 | 8/2020 | Klein | |
| 2021/0095757 | A1 | 4/2021 | Shultz et al. | |
| 2021/0396310 | A1 | 12/2021 | Kraemer et al. | |

(Continued)

FOREIGN PATENT DOCUMENTS

| CN | 111868420 A | 10/2020 | |
| DE | 102018131607 A1 * | 6/2020 | ............. F16H 61/28 |

(Continued)

OTHER PUBLICATIONS

International Searching Authority (ISA/US); Notification of Transmittal of the International Search Report and the Written Opinion of the International Searching Authority, or the Declaration of the International Application PCT/US23/31964; Date of mailing: Sep. 5, 2023; pp. 1-9.

*Primary Examiner* — Bobby Rushing, Jr.
(74) *Attorney, Agent, or Firm* — Taft Stettinius & Hollister LLP; Stephen F. Rost

(57) ABSTRACT

Transmissions, park systems, and methods of operating transmissions are disclosed herein. A transmission includes an input shaft to receive torque from a drive unit, an output shaft to transmit torque to a load, and a park system to selectively brake the output shaft. The park system includes a park actuation assembly having a park gear in direct contact with the output shaft, an actuator to supply rotational power, and an actuation linkage coupled between the actuator and the park actuation assembly.

20 Claims, 10 Drawing Sheets

(56) References Cited

U.S. PATENT DOCUMENTS

2021/0396311 A1    12/2021   Greb et al.
2023/0349464 A1*  11/2023   Haschke ............. F16H 63/3433

FOREIGN PATENT DOCUMENTS

| | | |
|---|---|---|
| DE | 102018132374 A1 * | 6/2020 |
| DE | 102019134730 A1 | 6/2021 |
| DE | 102020116983 A1 | 12/2021 |
| DE | 102020209016 A1 | 1/2022 |
| DE | 102020209726 A1 | 2/2022 |
| DE | 102020122693 A1 | 3/2022 |
| DE | 102020126399 A1 | 4/2022 |
| DE | 102020212584 A1 | 4/2022 |
| DE | 102021114251 A1 | 4/2022 |
| JP | H10-264791 A | 10/1998 |
| JP | 2011011579 A | 1/2011 |
| WO | WO-2021121484 A1 * | 6/2021 ......... F16H 63/3433 |

* cited by examiner

ELECTRIC PARK SYSTEMS, TRANSMISSIONS INCORPORATING THE SAME, AND METHODS FOR TRANSMISSIONS

FIELD OF THE DISCLOSURE

The present disclosure relates, generally, to park systems, and, more specifically, to electric park systems of transmissions.

BACKGROUND

One or more park systems may be incorporated into a transmission to selectively brake one or more components of the transmission and thereby provide a park operating mode of the transmission. In some cases, park systems may employ an external mechanism to drive operation of the park system. In some cases still, park systems may employ a hydraulic system having one or more hydraulically-powered mechanisms to drive operation of the park system. Systems, devices, and/or methods that avoid drawbacks associated with existing park systems remain an area of interest.

SUMMARY

The present disclosure may comprise one or more of the following features and combinations thereof.

According to one aspect of the present disclosure, a transmission may include an input shaft to receive torque from a drive unit, an output shaft to transmit torque to a load, and a park system to selectively brake the output shaft. The park system may include a park actuation assembly having a park gear in direct contact with the output shaft, an actuator, and an actuation linkage coupled between the actuator and the park actuation assembly to be moved by the actuator. In use of the transmission, the actuator may drive operation of the park actuation assembly through the actuation linkage such that the park system is operable in an engaged state, a disengaged state, and a staged state. In the engaged state, rotation of the park gear may be constrained to resist rotation of the output shaft. In the disengaged state, rotation of the park gear may be permitted to allow rotation of the output shaft. The staged state may be distinct from the engaged state and the disengaged state. The staged state may facilitate a transition to the engaged state in an event of an electrical failure or when park is selected by an operator.

In some embodiments, the actuator may be an electric actuator. The actuator may drive operation of the park actuation assembly through the actuation linkage without any hydraulically-powered component.

In some embodiments, the actuation linkage may include a screw directly coupled to the actuator to be driven by the actuator and a nut or axial cam coupled to the screw for translation along a first longitudinal axis in response to movement of the screw. The actuation linkage may include a lever directly coupled to the nut at one end of the lever, a sleeve directly coupled to the lever at another end of the lever arranged opposite the one end, and a rod supporting the sleeve and adapted for translation along a second longitudinal axis arranged parallel to the first longitudinal axis. The actuation linkage may include a collar affixed to the rod for translation therewith along the second longitudinal axis.

In some embodiments, the actuation linkage may include a preloaded spring supported by the rod that extends along the second longitudinal axis between the sleeve and a plurality of rollers of the park actuation assembly. The sleeve may be slidable along the second longitudinal axis relative to the rod and arranged in direct contact with the spring.

In some embodiments, the park system may include a latch and a latch solenoid operable to move the latch between a released position, in which the latch is spaced from the collar in each of the engaged state and the disengaged state of the park system, and a deployed position, in which the latch contacts the collar in the staged state of the park system. Additionally, in some embodiments, the park system may include a sensor to detect a position of the collar along the second longitudinal axis.

According to another aspect of the present disclosure, a park system to selectively brake an output shaft of a transmission may include a park actuation assembly, an electric actuator, and an actuation linkage. The park actuation assembly may include a park gear in direct contact with the output shaft. The electric actuator may supply rotational power. The actuation linkage may be coupled between the electric actuator and the park actuation assembly. In use of the park system, the electric actuator may drive operation of the park actuation assembly through the actuation linkage such that the park system is operable in an engaged state, a disengaged state, and a staged state. In the engaged state, rotation of the park gear may be constrained to resist rotation of the output shaft. In the disengaged state, rotation of the park gear may be permitted to allow rotation of the output shaft. The staged state may be distinct from the engaged state and the disengaged state. The staged state may facilitate a transition to the engaged state in an event of an electrical failure or when park is selected by an operator.

In some embodiments, the actuation linkage may include a screw directly coupled to the electric actuator to receive rotational power therefrom. The actuation linkage may include a nut threadably locked to the screw for translation along a first longitudinal axis in response to rotation of the screw. The actuation linkage may include a sleeve coupled to the nut and supported for slidable movement along a second longitudinal axis spaced from, and arranged parallel to, the first longitudinal axis.

In some embodiments, translation of the nut along the first longitudinal axis may drive translation of the sleeve along the first longitudinal axis. Additionally, in some embodiments, the actuation linkage may include a rod supporting the sleeve that is adapted for translation along the second longitudinal axis. The actuation linkage may include a collar affixed to the rod for translation therewith along the second longitudinal axis.

According to yet another aspect of the present disclosure, a method of operating a transmission including an input shaft, an output shaft, and a park system may include operating, by a controller of the transmission, the park system in an engaged state, operating, by the controller, the park system in a disengaged state, and operating, by the controller, the park system in a staged state distinct from the engaged state and the disengaged state. Operating the park system in the engaged state may include resisting rotation of the output shaft using a park actuation assembly of the park system. Operating the park system in the disengaged state may include allowing rotation of the output shaft. Operating the park system in the staged state may include transitioning the park system from the staged state to the engaged state in an event of an electrical failure or when park is selected by an operator.

In some embodiments, operating the park system in the engaged state may include receiving, by the controller, input to operate the park system in the engaged state, issuing, by the controller, a first control signal to a first electric actuator of the park system to drive operation of the park system in the engaged state in response to the received input to operate in the engaged state, issuing, by the controller, a second control signal to a second electric actuator of the park system to drive disengagement of a latch of the park system from a collar of the park system in response to the received input to operate in the engaged state, and measuring, by the controller and with a sensor, a first position of the collar along a longitudinal axis in response to the received input to operate in the engaged state.

In some embodiments, operating the park system in the disengaged state may include receiving, by the controller, input to operate the park system in the disengaged state, issuing, by the controller, a third control signal different from the first control signal to the first electric actuator to drive operation of the park system in the disengaged state in response to the received input to operate in the disengaged state, issuing, by the controller, the second control signal to the second electric actuator in response to the received input to operate in the disengaged state, and measuring, by the controller and with the sensor, a second position of the collar along the longitudinal axis in response to the received input to operate in the disengaged state.

In some embodiments, operating the park system in the staged state may include receiving, by the controller, input to operate the park system in the staged state, issuing, by the controller, a fourth control signal different from the first control signal and the third control signal to the first electric actuator to drive operation of the park system in the staged state in response to the received input to operate in the staged state, issuing, by the controller, a fifth control signal different from the second control signal to the second electric actuator to drive engagement of the latch with the collar in response to the received input to operate in the staged state, and measuring, by the controller and with the sensor, a third position of the collar along the longitudinal axis in response to the received input to operate in the staged state.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
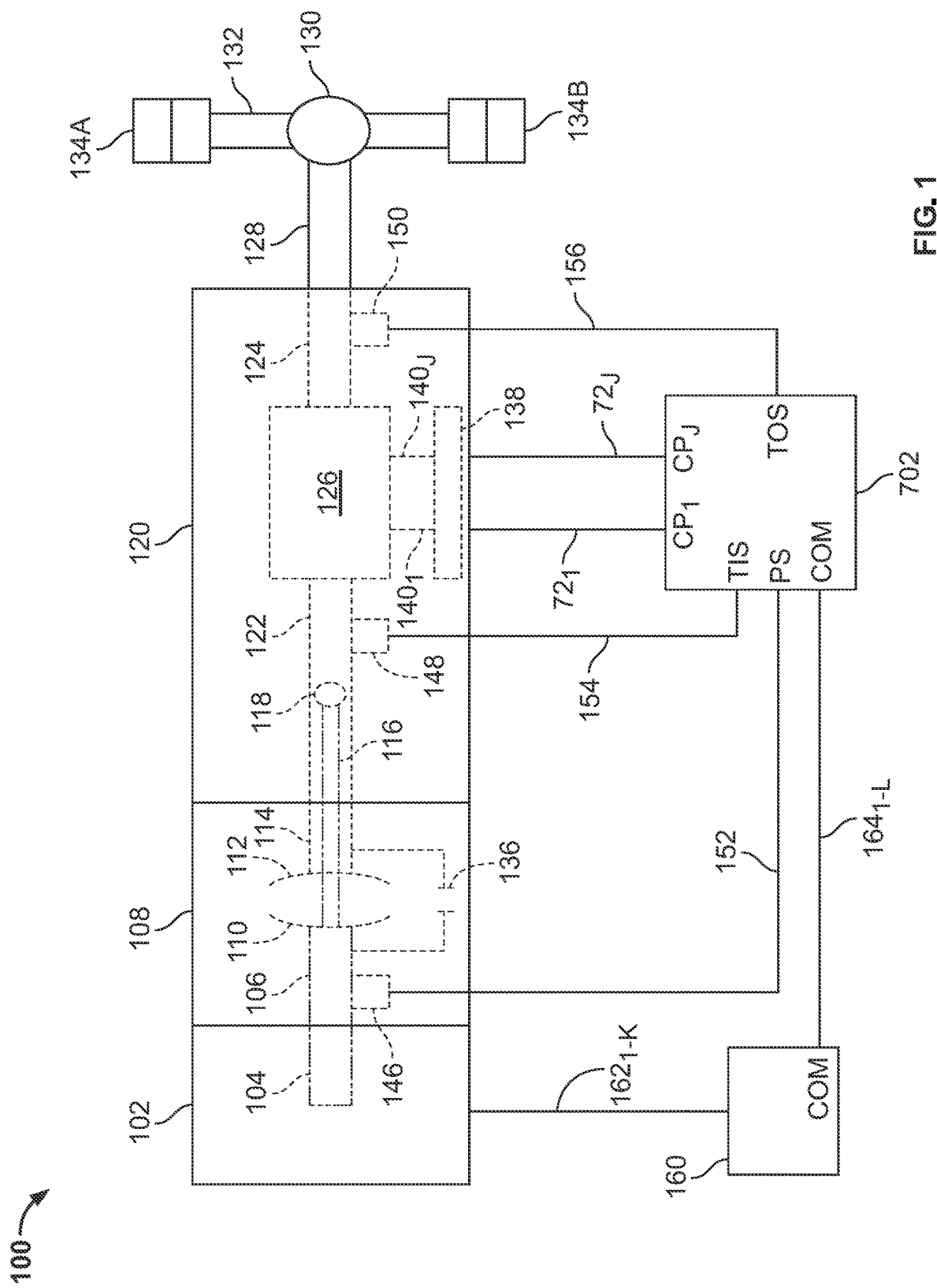
FIG. 1 is a diagrammatic view of a drive system for a vehicle incorporating a transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java™, C++ ™, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative drive system 100 for a vehicle includes a transmission 120. The transmission 120 is configured to receive rotational power supplied by a drive unit 102 and provide the rotational power to a load (e.g., an axle 132 and wheels 134A, 134B mounted thereto) in use thereof. The transmission 120 includes an input shaft 122, an output shaft 124, and a park system 200 (see FIG. 2). The input shaft 122 includes, or is otherwise embodied as, any structure or collection of structures configured to receive torque/rotational power from the drive unit 102. The output shaft 124 includes, or is otherwise embodied as, any structure or collection of structures configured to transmit torque/rotational power from the input shaft 122 to a load, which, in addition to the axle 132 and the wheels 134A, 134B, may include one or more transaxles, differentials, transfer boxes, final drives, and/or wheels, for example. As discussed below, the park system 200 includes at least one component in direct contact with the output shaft 124. As will be apparent from the discussion that follows, the park system 200 is configured to selectively brake the output shaft 124 during a park operational mode of the transmission 120.

Figure 2:
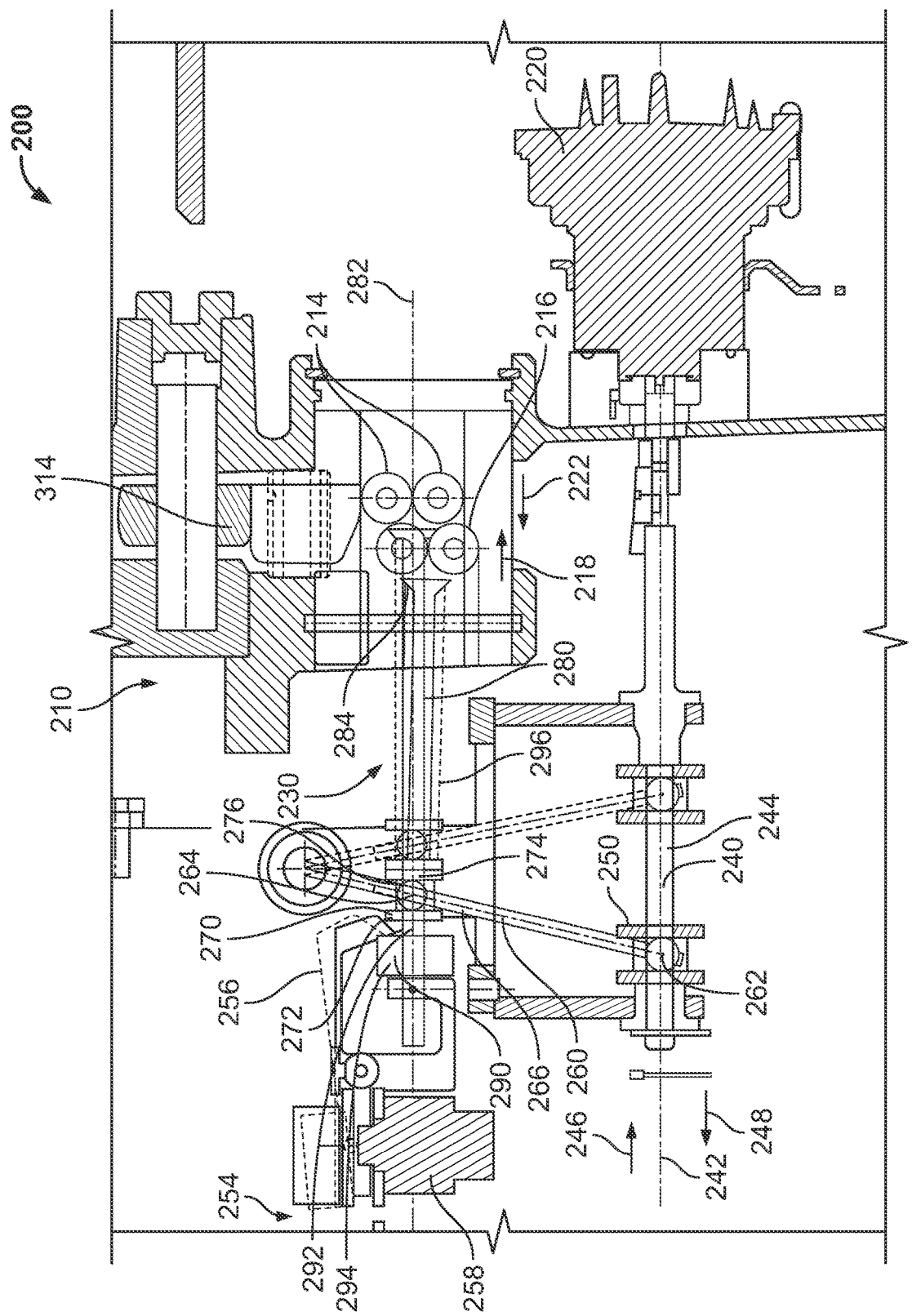
FIG. 2 is a partial elevation view of a park system included in the transmission shown in FIG. 1.
Figure 3:
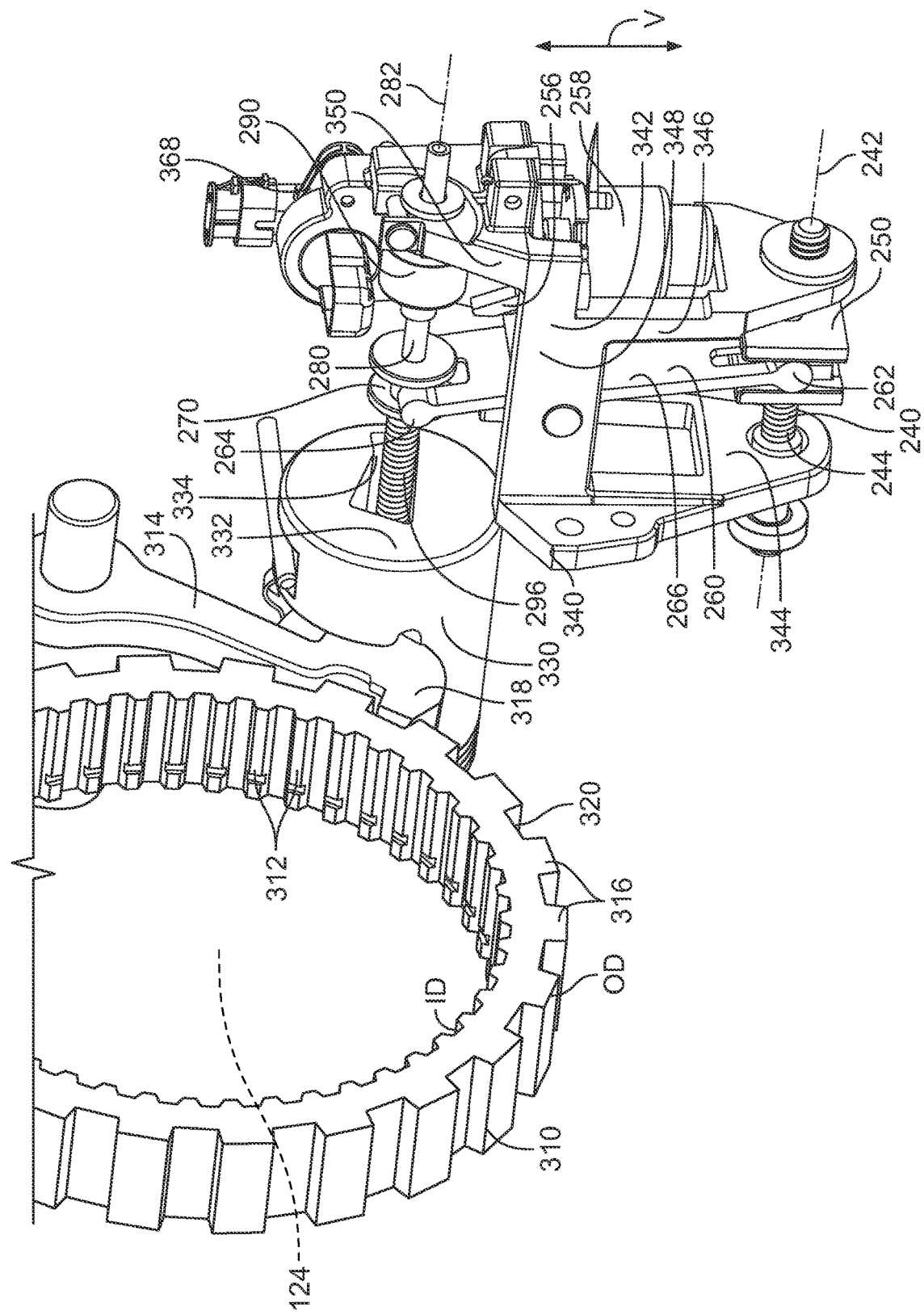
FIG. 3 is a perspective view of at least a portion of the park system of FIG. 2.

Referring now to FIG. 2, the illustrative park system 200 includes a park actuation assembly 210. Among other things, the park actuation assembly 210 includes a park gear 310 (see FIG. 3) arranged in direct contact with the output shaft 124 as indicated in FIG. 3. In particular, the park gear 310 receives the output shaft 124 such that inner teeth or splines 312 of the park gear 310 mate or mesh with corresponding features (e.g., grooves, notches, recesses, channels, or the like) of the output shaft 124. Interaction between the complementary features of the park gear 310 and the output shaft 124 couples the park gear 310 and the output shaft 124 for common rotation and/or lack thereof.

The illustrative park system 200 includes a rotary actuator 220 coupled to the park actuation assembly 210. The actuator 220 includes, or is otherwise embodied as, any electric motor, electric power plant, electric drive unit, or the like configured to supply rotational power to drive operation of the park actuation assembly 210, as further discussed below. In some embodiments, the actuator 220 includes, or is otherwise embodied as, a brushed DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. Additionally, in some embodiments, the actuator 220 includes, or is otherwise embodied as, any device or collection of devices capable of converting electrical energy to rotational power to drive operation of the park actuation assembly 210.

The park system 200 illustratively includes an actuation linkage 230 coupled between the actuator 220 and the park actuation assembly 210. As described in further detail below, the actuation linkage 230 includes a number of mechanical and/or electromechanical structures that cooperate to operatively couple the actuator 220 to the park actuation assembly 210. Consequently, in use of the transmission 120, the actuator 220 drives operation of the park actuation assembly 210 through the actuation linkage 230 to establish a plurality of operating states of the park system 200. Those operating states include an engaged state 400 (see FIG. 4), a disengaged state 500 (see FIG. 5), and a staged state 600 (see FIG. 6), which are further discussed below. In the engaged state 400 of the park system 200, rotation of the park gear 310 is constrained to resist rotation of the output shaft 124. In the disengaged state 500 of the park system 200, rotation of the park gear 310 is permitted to allow rotation of the output shaft 124. The staged state 600 of the park system 200, which is distinct from the engaged state 400 and the disengaged state 500, facilitates a transition to the engaged state 400 in the event of an electrical failure or in the event that input (e.g., from an operator) to operate in a park operating mode is received by a control system 700.

The park system 200 of the present disclosure utilizes the electric actuator 220 without, and in place of, a mechanically-powered (e.g., hydraulically or pneumatically-powered) actuator to drive operation of the park actuation assembly 210 through the actuation linkage 230 in the aforesaid operational states. It should be appreciated that the illustrative park system 200 provides a mechanism for engaging (i.e., in the engaged state 400) and disengaging (i.e., in the disengaged state 500) the park actuation assembly 210 without an external device. Furthermore, as will be apparent from the discussion that follows, the illustrative staged state 600 of the park system 200 provides a fail-to-park operational mode to immediately transition the park system 200 to the engaged state 400 in an event of an electrical failure (e.g., a loss of power).

In the illustrative embodiment, the transmission 120 includes a control system 700 (see FIG. 7) that is configured to control operation of various components of the transmission 120 (e.g., one or more clutches, an electro-hydraulic system 138) and operation of the park system 200 (e.g., the actuator 220). The control system 700 includes a controller 702 that is communicatively coupled to various electromechanical components of the park system 200, among other things. Methods and/or activities that may be performed by the controller 702 to control operation of the park system 200 are described in greater detail below with reference to FIGS. 8-11.

Referring again to FIG. 1, it should be appreciated that the illustrative transmission 120, and the drive system 100 incorporating the transmission 120, are adapted for use in one or more vehicles employed in a variety of applications. In some embodiments, the transmission 120 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the transmission 120 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the transmission 120 includes one or more clutches (not shown). The one or more clutches may be included in, or otherwise adapted for use with, the electro-hydraulic system 138 and coupled between the input shaft 122 and the output shaft 124 to selectively transmit rotational power between the shafts 122, 124 in one or more operating modes of the transmission 120. Each of the one or more clutches may be selectively engageable in response to one or more fluid pressures applied thereto.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118 through the torque converter 108.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the one or more clutches and the electro-hydraulic system 138 under control by the controller 702, the gearing system 126 may provide, or otherwise be associated with, one or more operating ranges selectable by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134A, 134B. In this arrangement, the output shaft 124 drives the wheels 134A, 134B through the propeller shaft 128, the universal joint 130, and the axle 132 in use of the drive system 100. Of course, it should be appreciated that, in other embodiments, the output shaft 124 may drive the wheels 134A, 134B through another suitable mechanism and/or collection of structures.

The illustrative transmission 120 includes the electro-hydraulic system 138 that is fluidly coupled to the gearing system 126 via a number (i.e., J) of fluid paths $140_1$-$140_J$, where J may be any positive integer. The electro-hydraulic system 138 is configured to receive control signals provided by various electro-hydraulic control devices (not shown), such as one or more sensors and one or more flow and/or pressure control devices, for example. In response to those control signals, and under control by the controller 702, the electro-hydraulic system 138 selectively causes fluid to flow through one or more of the fluid paths $140_1$-$140_J$ to control operation (e.g., engagement and disengagement) of one or more friction devices (e.g., the one or more clutches) included in, or otherwise adapted for use with, the gearing system 126.

Of course, it should be appreciated that the one or more friction devices may include, but are not limited to, one or more brake devices, one or more torque transmitting devices (i.e., clutches), and the like. Generally, the operation (e.g., engagement and disengagement) of the one or more friction devices is controlled by selectively controlling the friction applied by, or otherwise associated with, each of the one or more friction devices, such as by controlling fluid pressure applied to each of the friction devices, for example. In the illustrative embodiment, which is not intended to be limiting in any way, the electro-hydraulic system 138 may be coupled to, or otherwise adapted for use with, one or more brakes. Similar to the clutches, each of the one or more brakes may be controllably engaged and disengaged via fluid pressure supplied by the electro-hydraulic system 138. In any case, changing or shifting between the various gears of the transmission 120 is accomplished by selectively controlling the friction devices via control of fluid pressure within the number of fluid paths $140_1$-$140_J$.

In the illustrative drive system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 702 via a signal path 152, and the controller 702 is operable to process the speed signal produced by the speed sensor 146 to determine the rotational speed of the pump shaft 106/drive unit output shaft 104.

In the illustrative drive system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 702 via a signal path 154, and the controller 702 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 702 via a signal path 156. The controller 702 is configured to process the speed signal produced by the speed sensor 150 to determine the rotational speed of the transmission output shaft 124.

In some embodiments, the electro-hydraulic system 138 includes one or more actuators configured to control various operations within the transmission 120. For example, the electro-hydraulic system 138 may include a number of actuators that are electrically connected to a number (i.e., J) of control outputs $CP_1$-$CP_J$ of the controller 702 via a corresponding number of signal paths $72_1$-$72_J$, where J may be any positive integer as described above. Each of the actuators may receive a corresponding one of the control signals $CP_1$-$CP_J$ produced by the controller 702 via one of the corresponding signal paths $72_1$-$72_J$. In response thereto, each of the actuators may control the friction applied by each of the friction devices by controlling the pressure of fluid within one or more corresponding fluid passageway $140_1$-$140_J$, thereby controlling the operation of one or more corresponding friction devices based on information provided by the various speed sensors 146, 148, and/or 150 in use of the system 100.

In the illustrative embodiment, the drive system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 702 via a number (i.e., L) of signal paths 164, wherein L may be any positive integer. It should be appreciated that the one or more signal paths 164 may be referred to collectively as a data link. Generally, the drive unit controller 160 and the transmission controller 702 are operable to share information via the one or more signal paths 164. In one embodiment, for example, the drive unit controller 160 and the transmission controller 702 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 702 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring again to FIG. 2, the park actuation assembly 210 illustratively includes the park gear 310, a park pawl 314 (best seen in FIG. 3), a plurality of rollers 214, and a ramp 216. The park pawl 314 is movable to directly contact the park gear 310 (e.g., in the engaged state 400 of the park system 200) and to be spaced from, and not in direct contact with, the park gear 310 (e.g., in the disengaged state 500). At least one of the rollers 214 is movable along the ramp 216 (i.e., in the direction indicated by arrow 218) to cause contact between the park pawl 314 and the park gear 310. At least one of the rollers 214 is movable along the ramp 216 (i.e., in the direction indicated by arrow 222) to cause the park pawl 314 to be spaced from the park gear 310. The rollers 214 may be coupled together for common movement along and/or parallel to the ramp 216 by a carriage or carrier (not shown).

In the illustrative embodiment, the rollers 214 are operatively coupled to, and attached to, a rod 280 of the actuation linkage 230 that, as discussed below, is adapted for translation along a longitudinal axis 282. In particular, a flanged end 284 of the rod 280 is configured for direct interaction with the rollers 214. Although the rod 280 is described herein as a component of the actuation linkage 230, the rod 280 may be incorporated into the park actuation assembly 210 and considered a component of the park actuation assembly 210, at least in some embodiments.

In operation of the park system 200 (e.g., in or immediately prior to the engaged state 400), the rod 280 translates along the axis 282 to drive movement of the rollers 214 attached to the rod 280 along the ramp 216 in the direction 218. Additionally, in operation of the park system 200 (e.g., in or immediately prior to the disengaged state 500), the rod 280 translates along the axis 282 such that the rod 280 is spaced from, and not in direct contact with, the rollers 214, thereby permitting movement of the rollers 214 along the ramp 216 in the direction indicated by arrow 222.

The illustrative actuation linkage 230 of the park system 200 includes a screw 240, a nut 250, a lever 260, a sleeve 270, the rod 280, a collar 290, and a spring 296. Interaction between those components is further discussed below. Throughout operation of the park system 200, the screw 240, the nut 250, the lever 260, the sleeve 270, the rod 280, the collar 290, and the spring 296 cooperate to operatively couple the actuator 220 to the park actuation assembly 210.

The screw 240 of the illustrative actuation linkage 230 is directly coupled to the actuator 220 to receive rotational power therefrom. The screw 240 extends along a longitudinal axis 242 arranged parallel to the longitudinal axis 282. The screw 240 illustratively includes external threads 244 adapted to mate with corresponding features of the nut 250. In the illustrative embodiment, rotation of the actuator 220 in one direction (e.g., a clockwise direction) drives rotation of the screw 240 to cause translation of the screw 240 along the axis 242 in a direction indicated by arrow 246. Additionally, in the illustrative embodiment, rotation of the actuator 220 in another direction (e.g., a counterclockwise direction) drives rotation of the screw 240 to cause translation of the screw 240 along the axis 242 in a direction indicated by arrow 248.

The nut 250 of the illustrative actuation linkage 230 is threadably locked to the screw 240 for translation along the longitudinal axis 242 in response to rotation of the screw 240. The nut 250 includes internal features (e.g., internal threads complementary to the external threads 244) to lock the nut 250 to the screw 240. In the illustrative embodiment, the internal features of the nut 250 and the external threads 244 of the screw 240 establish a self-locking engagement mechanism between the components 240, 250. Consequently, rotation of the screw 240 by the actuator 220 is required to enable movement of the nut 250 along the longitudinal axis 242 in use of the park system 200. However, in other embodiments, it should be appreciated that other mechanical devices may be utilized in lieu of the screw 240 and the nut 250 to transfer drive from the actuator 220. In one example, drive may be transferred from the actuator 220 by an axial cam coupled to the actuator 220 and a follower coupled to the axial cam.

The lever 260 of the illustrative actuation linkage 230 is directly coupled to the nut 250 at one end 262 thereof and directly coupled to the sleeve 270 at another end 264 thereof arranged opposite the end 262. The lever 260 illustratively includes, or is otherwise embodied as, a link 266 that serves to interconnect the nut 250 and the sleeve 270 to coordinate movement of the nut 250 along the longitudinal axis 242 with movement of the sleeve 270 along the longitudinal axis 282. In some embodiments, the link 266 may include, or otherwise be embodied as, a resilient and/or flexible structure capable of some degree of deformation in use of the park system 200.

The sleeve 270 of the illustrative actuation linkage 230 is slidable along the longitudinal axis 282 relative to the rod 280 and mounted on the rod 280 to permit translation along the axis 282. Throughout operation of the park system 200, the sleeve 270 is arranged in direct contact with the spring 296. Such contact biases the sleeve 270 away from movement along the longitudinal axis 282 toward the park actuation assembly 210. The sleeve 270 includes lobes 272, 274 arranged opposite one another and a core 276 interconnecting the lobes 272, 274. The lobes 272, 274 each have a diameter greater than a diameter of the core 276.

Figures 4, 5:
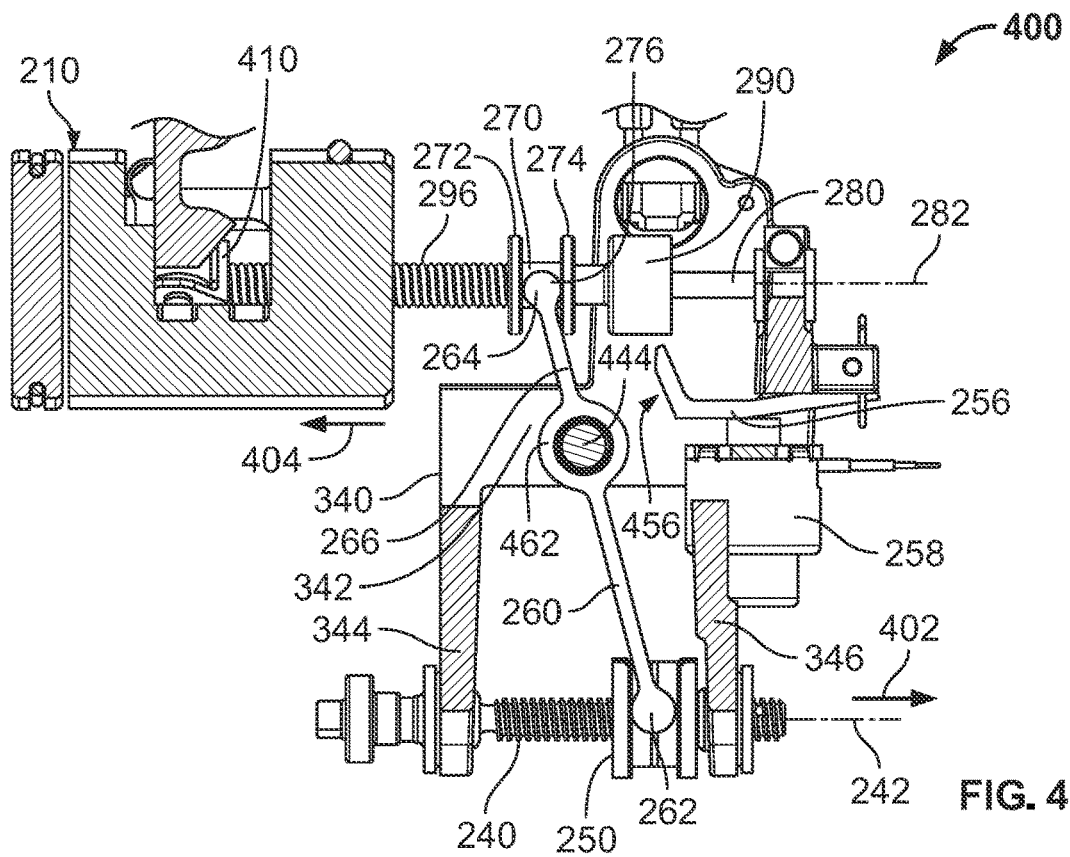
FIG. 4 is an elevation view of at least a portion of the park system of FIG. 2 showing the park system in an engaged state.
FIG. 5 is an elevation view of at least a portion of the park system of FIG. 2 showing the park system in a disengaged state.
Figure 6:
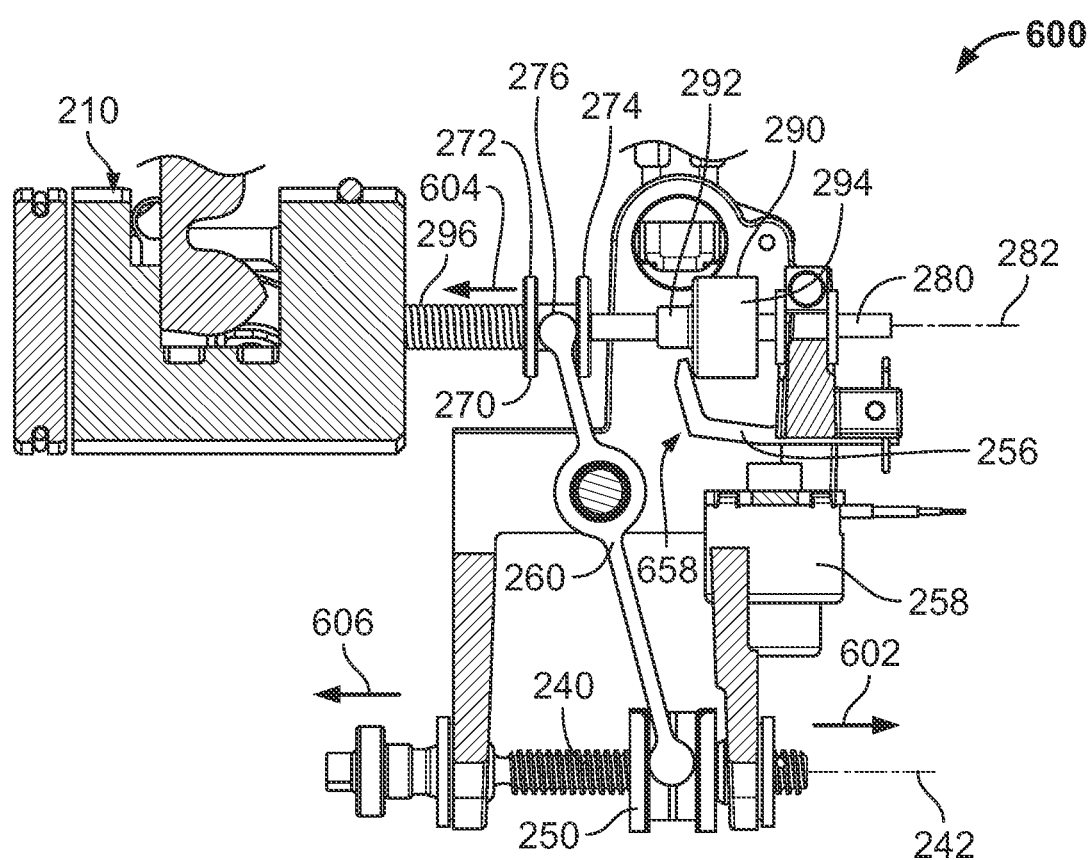
FIG. 6 is an elevation view of at least a portion of the park system of FIG. 2 showing the park system in a staged state.

The rod 280 of the illustrative actuation linkage 230 supports the sleeve 270 and is adapted for translation along the longitudinal axis 282 as mentioned above. The rod 280 also supports the spring 296 for extension and compression along the longitudinal axis 282. Translation of the rod 280 along the longitudinal axis 282 is best seen in FIGS. 4-6. As further discussed below with reference to FIG. 6, the rod 280 is constrained against translation along the longitudinal axis 282 toward the park actuation assembly 210 in the staged state 600 of the park system 200.

The collar 290 of the illustrative actuation linkage 230 is affixed to the rod 280 for translation therewith along the longitudinal axis 282 in operation of the park system 200. The collar 290 illustratively includes a neck 292 and a body 294 interconnected with the neck 292. The neck 292 has a first diameter and the body 294 has a second diameter greater than the first diameter. The neck 292 of the collar 290 is configured for direct contact with the sleeve 270 in each of the engaged and disengaged states 400, 500 of the park system 200 as best seen in FIGS. 4 and 5.

The spring 296 of the actuation linkage 230 extends along the longitudinal axis 282 between the sleeve 270 and the rollers 214 of the park actuation assembly 210. An abutment 410 (see FIG. 4) arranged adjacent the park actuation assembly 210 contacts the spring 296 to preload the spring 296 throughout operation of the park system 200. Movement of the sleeve 270 along the longitudinal axis 282 toward the park actuation assembly 210 drives compression of the spring 296, at least in some embodiments. Additionally, in at least some embodiments, movement of the sleeve 270 along the longitudinal axis 282 away from the park actuation assembly 210 drives extension of the spring 296.

The illustrative park system 200 includes a latch system 254 operable to at least partially restrict movement of the collar 290, and thereby the rod 280, along the longitudinal axis 282 in the staged state 600 of the system 200. The latch system 254 illustratively includes a latch 256, a latch solenoid 258, and a sensor 368 (see FIG. 3). The latch 256 includes, or is otherwise embodied as, an arm movable to directly contact the collar 290. The latch solenoid 258 includes, or is otherwise embodied as, one or more electric actuators to drive movement of the latch 256 between a released position 456 (see FIG. 4) and a deployed position 658 (see FIG. 6). As discussed below with reference to FIGS. 4 and 5, in the released position 456, the latch 256 is spaced from the collar 290. As discussed below with reference to FIG. 6, in the deployed position 658, the latch 256 directly contacts the collar 290. The sensor 368 includes, or is otherwise embodied as, one or more monitoring devices capable of detecting a position of the collar 290 along the longitudinal axis 282 in use of the park system 200.

Referring now to FIG. 3, the park gear 310 and the park pawl 314 of the illustrative park actuation assembly 210 are depicted in greater detail. The teeth or splines 312 of the park gear 310 at least partially define an inner diameter ID of the park gear 310. Keys 316 of the park gear 310 at least partially define an outer diameter OD of the park gear 310. The park pawl 314 includes a catch 318 sized to be received in a notch 320 located between each pair of circumferentially adjacent keys 316. In the engaged state 400 of the park system 200, the catch 318 is received in a notch 320 such that the park pawl 314 resists and/or prevents rotation of the park gear 310 and the output shaft 124. In the disengaged state 500 of the park system 200, the catch 318 is disposed outside each notch 320 to permit rotation of the park gear 310 and the output shaft 124.

In the illustrative embodiment, the park pawl 314 is mounted to, and/or at least partially received by, a housing 330 of the park actuation assembly 210. The illustrative housing 330 includes a cylinder block 332 having a central passageway 334 through which the longitudinal axis 282 extends. In at least some embodiments, a portion of the park pawl 314 extends at least partway through the cylinder block 332 into the passageway 334. Further, in at least some embodiments, the rod 280, the spring 296, and the rollers 214 are at least partially arranged in the passageway 334, and the ramp 216 is formed by an interior surface (not shown) of the cylinder block 332 that at least partially defines the passageway 334.

The illustrative park system 200 includes a mounting frame 340 supporting various structures of the park system

200. The mounting frame 340 includes an upper mount block 342 and a pair of lower hangers 344, 346 appended to the upper mount block 342 that extend downwardly away from the upper mount block 342 in a vertical direction V. The upper mount block 342 includes a base 348 and an extension 350 interconnected with the base 348 that extends upwardly therefrom in the vertical direction V. The upper mount block 342 at least partially supports the latch system 254, the lever 260, the sleeve 270, the rod 280, the collar 290, and the spring 296. The lower hangers 344, 346 at least partially support the screw 240, the nut 250, and the lever 260.

The upper mount block 342 of the illustrative mounting frame 340 is at least partially aligned with the longitudinal axis 282 in the vertical direction V. In the illustrative embodiment, the upper mount block 342 extends at least partway around the longitudinal axis 282 and supports the rod 280 such that the rod 280 extends along the longitudinal axis 282. The latch 256, the latch solenoid 258, and the sensor 368 are coupled to, and supported by, the upper mount block 342. A ring 462 (see FIG. 4) formed in the lever 260 receives a post 444 of the upper mount block 342 such that the lever 260 is pivotally coupled to the upper mount block 342.

The lower hangers 344, 346 of the illustrative mounting frame 340 are at least partially aligned with the longitudinal axis 242 in the vertical direction V. In the illustrative embodiment, each of the lower hangers 344, 346 extends all the way around the longitudinal axis 242, and the hangers 344, 346 cooperate to support the screw 240 such that the screw 240 extends along the longitudinal axis 242. The hangers 344, 346 limit longitudinal translation of the screw 240 and the nut 250 along the axis 242 during operation of the park system 200.

Referring now to FIG. 4, operation of the park system 200 in the engaged state 400 is illustrated. As discussed above, rotation of the park gear 310 is constrained by the park pawl 314 in the engaged state 400 of the park system 200 to resist rotation of the output shaft 124 and establish a park operating mode of the transmission 120. In the engaged state 400, the electric actuator 220 drives rotation of the screw 240 and corresponding translation of the nut 250 along the longitudinal axis 242 in the direction indicated by arrow 402. As a result, the nut 250 is disposed in close proximity to, and/or in contact with, the lower hanger 346 of the mounting frame 340 in the engaged state 400 of the park system 200. For the sake of illustration, translation of the nut 250 along the axis 242 in the direction indicated by arrow 402 corresponds to rightward linear movement of the nut 250 toward the lower hanger 346.

Due to the operative coupling between the nut 250 and the sleeve 270 provided by the lever 260, translation of the nut 250 along the axis 242 in the direction indicated by arrow 402 drives translation of the sleeve 270 along the longitudinal axis 282 in the direction indicated by arrow 404. Additionally, the collar 290 contacts the sleeve 270 in the engaged state 400 of the park system 200 and applies a contact force (not shown) to the sleeve 270 in the direction indicated by arrow 404. In some embodiments, translation of the sleeve 270 along the longitudinal axis 282 in the direction indicated by arrow 404 may be accompanied by, or may at least partially cause, corresponding translation of the rod 280 and the collar 290 in the direction indicated by arrow 404. In such embodiments, translation of the rod 280 in the direction indicated by arrow 404 may cause movement of the rollers 214 along the ramp 216 to place the catch 318 of the park pawl 314 in the notch 320 of the park gear 310.

In the engaged state 400 of the park system 200, the latch solenoid 258 is retracted such that the latch 256 is in the released position 456. As a result, movement of the rod 280 and the collar 290 is not restricted or constrained by the latch 256 in the engaged state 400. In some embodiments, the latch solenoid 258 is de-energized, powered off, or de-activated in the engaged state 400. In other embodiments, however, the latch solenoid 258 may be energized, powered on, or activated in the engaged state 400 of the park system 200.

Referring now to FIG. 5, operation of the park system 200 in the disengaged state 500 is illustrated. As discussed above, rotation of the park gear 310 is permitted by the park pawl 314 to allow rotation of the output shaft 124 in one or more non-park operating modes (e.g., one or more forward drive mode(s), reverse drive modes(s), or neutral mode(s)) of the transmission 120. In the disengaged state 500, the electric actuator 220 drives rotation of the screw 240 and corresponding translation of the nut 250 along the longitudinal axis 242 in the direction indicated by arrow 506. As a result, the nut 250 is disposed in close proximity to, and/or in contact with, the lower hanger 344 of the mounting frame 340 in the disengaged state 500 of the park system 200. For the sake of illustration, translation of the nut 250 along the axis 242 in the direction indicated by arrow 506 corresponds to leftward linear movement of the nut 250 toward the lower hanger 344.

Due to the operative coupling between the nut 250 and the sleeve 270 provided by the lever 260, translation of the nut 250 along the axis 242 in the direction indicated by arrow 506 drives translation of the sleeve 270 along the longitudinal axis 282 in the direction indicated by arrow 508. The collar 290 contacts the sleeve 270 in the disengaged state 500 of the park system 200 and applies a contact force to the sleeve 270 in the direction indicated by arrow 404. In the illustrative embodiment, translation of the sleeve 270 along the longitudinal axis 282 in the direction indicated by arrow 508 causes corresponding translation of the rod 280 and the collar 290 in the direction indicated by arrow 508. Consequently, translation of the rod 280 in the direction indicated by arrow 508 causes movement of the rollers 214 along the ramp 216 to place the catch 318 of the park pawl 314 outside of the notch 320 of the park gear 310.

In the disengaged state 500 of the park system 200, similar to the engaged state 400, the latch solenoid 258 is retracted such that the latch 256 is in the released position 456. As a result, movement of the rod 280 and the collar 290 is not restricted or constrained by the latch 256 in the disengaged state 500. In some embodiments, the latch solenoid 258 is de-energized, powered off, or de-activated in the disengaged state 500. In other embodiments, however, the latch solenoid 258 may be energized, powered on, or activated in the disengaged state 500 of the park system 200.

Referring now to FIG. 6, operation of the park system 200 in the disengaged state 600 is illustrated. In the illustrative embodiment, as mentioned above, the staged state 600 is separate and distinct from the engaged and disengaged states 400 and 500. In the staged state 600, rotation of the park gear 310 is at least partially permitted by the park pawl 314 to allow rotation of the output shaft 124. Thus, at least in some embodiments, the staged state 600 may correspond to, or otherwise be associated with, a non-park operating mode of the transmission 120 which provides a failure-to-park mechanism.

In some embodiments, the staged state 600 of the park system 200 may correspond to an intermediate operational stage between the engaged state 400 and the disengaged state 500. In any case, as mentioned above, the staged state 600 facilitates, provides, and/or effects a transition to the engaged state 400 in an event of an electrical failure. Additionally, the staged state 600 may facilitate a transition to the engaged state 400 in response to input (i.e., received by the controller 702) indicative of user selection of a park operating mode of the transmission 102. It should be appreciated that in use of the park system 200, an electrical failure (e.g., a loss of power, abnormal electric current, a transient fault, a persistent fault, an asymmetric fault, a symmetric fault, or any other electrical fault) may impact operation of the electric actuator 220 and/or the latch solenoid 258, among other electrically-powered devices included in the transmission 120.

In the staged state 600, the electric actuator 220 drives rotation of the screw 240 and corresponding translation of the nut 250 along the longitudinal axis 242 in the direction indicated by arrow 602. As a result, the nut 250 is disposed in closer proximity to the lower hanger 346 than the lower hanger 344 in the staged state 600 of the park system 200. In the illustrative embodiment, the position of the nut 250 along the axis 242 in the staged state 600 substantially corresponds to the position of the nut 250 along the axis 242 in the engaged state 400.

Due to the operative coupling between the nut 250 and the sleeve 270 provided by the lever 260, translation of the nut 250 along the axis 242 in the direction indicated by arrow 602 drives translation of the sleeve 270 along the longitudinal axis 282 in the direction indicated by arrow 604. However, in contrast to each of the engaged and disengaged states 400, 500 of the park system 200, movement of the rod 280 and the collar 290 along the longitudinal axis 282 toward the park actuation assembly 210 is constrained by the latch 256 in the staged state 600. As a result of that constraint, the collar 290 does not contact the sleeve 270 in the staged state 600 and is spaced from the sleeve 270 along the longitudinal axis 282.

In the staged state 600 of the park system 200, the latch solenoid 258 is extended to drive movement of the latch 256 to the deployed position 658. Contact between the latch 256 and the collar 290 in the staged state 600 resists movement of the rod 280 and the collar 290 toward the park actuation assembly 210 along the longitudinal axis 282. In some embodiments, the latch solenoid 258 is energized, powered on, or activated in the staged state 600. In other embodiments, however, the latch solenoid 258 may be de-energized, powered off, or de-activated in the staged state 600 of the park system 200.

In some embodiments, in an event of an electrical failure in the staged state 600 of the park system 200, the latch 256 may transition from the deployed position 658 to the released position 456. As a result, the rod 280 and the collar 290 may translate along the longitudinal axis 282 (e.g., from the respective positions associated with the staged state 600) in the direction indicated by arrow 604 such that the collar 290 contacts the sleeve 270. It should be appreciated that the position of the sleeve 270 in the staged state 600 of the park system 200 substantially corresponds to the position of the sleeve 270 in the disengaged state 500.

Figure 7:
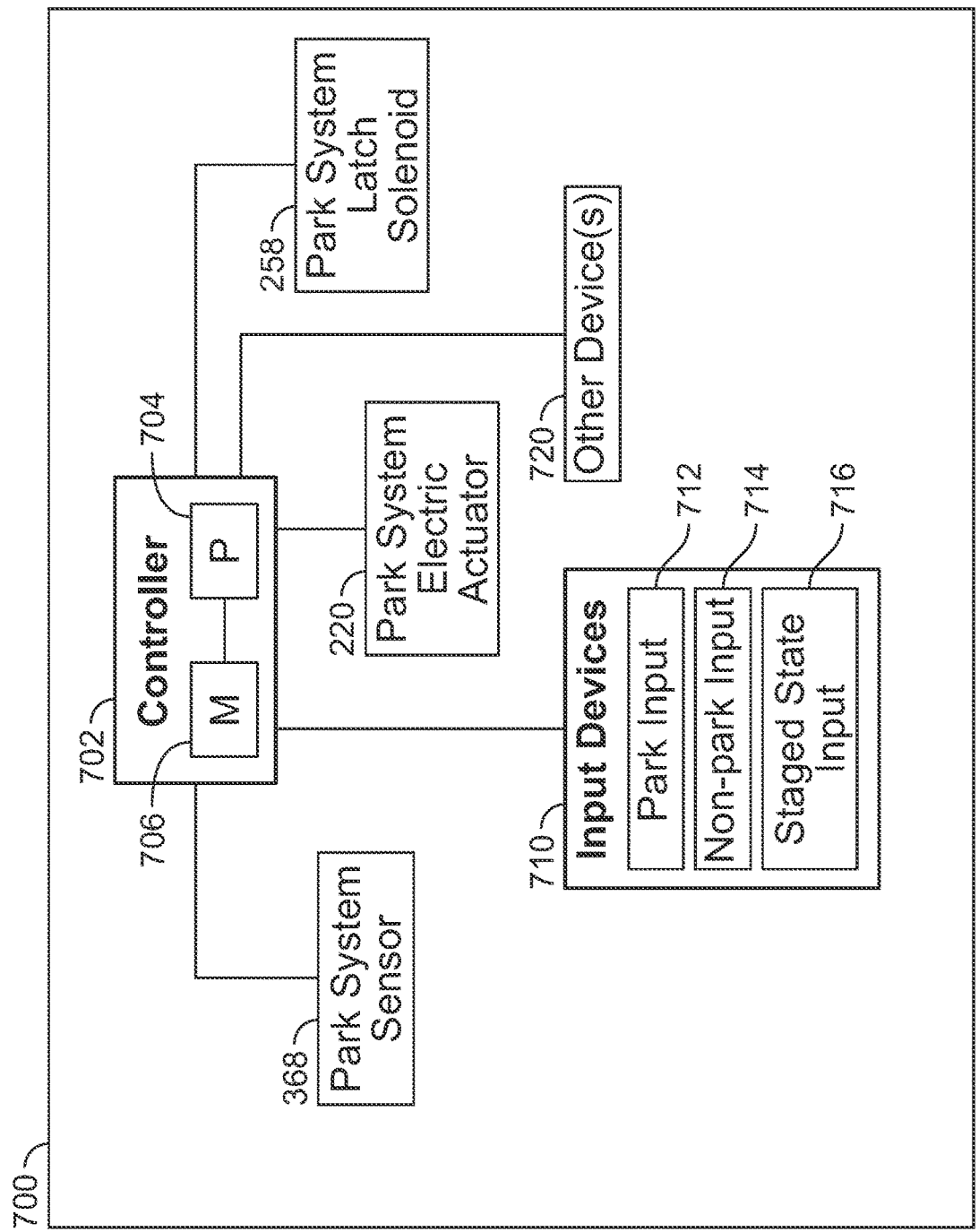
FIG. 7 is a diagrammatic view of a control system for the drive system of FIG. 1.

Referring now to FIG. 7, in the illustrative embodiment, the control system 700 includes the electric actuator 220, the latch solenoid 258, the sensor 368, the controller 702, input devices 710, and other device(s) 720. Each of the devices 220, 258, 368, 710, 720 is communicatively coupled to the controller 702, such as by a direct (e.g., hardwired) connection or a controller area network (CAN) interface, for example. Of course, it should be appreciated that the control system 700 may include other electrical and/or electromechanical devices in addition to, or as an alternative to, the devices depicted in FIG. 7. In any case, the illustrative controller 702 includes a processor 704 (or one or more processors) and at least one memory device 706 communicatively coupled to the processor 704.

The processor 704 of the illustrative controller 702 may be embodied as, or otherwise include, any type of processor, controller, or other compute circuit capable of performing various tasks such as compute functions and/or controlling the functions of the transmission 120 and/or the park system 200, for example. For example, the processor 704 may be embodied as a single or multi-core processor(s), a microcontroller, or other processor or processing/controlling circuit. In some embodiments, the processor 704 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 704 may be embodied as, or otherwise include, a high-power processor, an accelerator co-processor, or a storage controller. In some embodiments still, the processor 704 may include more than one processor, controller, or compute circuit.

The memory device 706 of the illustrative controller 702 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at wwwjedec.org). Such standards (and similar standards) may be referred to as DDR-based standards and communication interfaces of the storage devices that implement such standards may be referred to as DDR-based interfaces.

In some embodiments, the memory device 706 may be embodied as a block addressable memory, such as those based on NAND or NOR technologies. The memory device 306 may also include future generation nonvolatile devices, such as a three dimensional crosspoint memory device (e.g., Intel 3D XPoint™ memory), or other byte addressable write-in-place nonvolatile memory devices. In some embodiments, the memory device 706 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

In some embodiments, the electric actuator 220 includes, or is otherwise embodied as, an electric stepper motor or other suitable electric actuator. Additionally, in some embodiments, the electric actuator 220 includes, or is otherwise embodied as, an actuator having a normally-open or normally-on state. However, in other embodiments, the electric actuator 220 may include, or otherwise be embodied as, an actuator having a normally-closed state or normally-off state.

In some embodiments, the latch solenoid 258 includes, or is otherwise embodied as, any electrical device or collection of electrical devices capable of converting electrical energy into mechanical work to drive movement of the latch 256 between the released position 456 and the deployed position 658. Additionally, in some embodiments, the latch solenoid 258 includes, or is otherwise embodied as, an actuator having a normally-closed state or normally-off state. However, in other embodiments, the latch solenoid 258 includes, or is otherwise embodied as, an actuator having a normally-open or normally-on state.

In some embodiments, the sensor 368 includes, or is otherwise embodied as, any electrical device or collection of electrical devices capable of detecting a position of the collar 290 along the longitudinal axis 282 in use of the park system 200. Additionally, in some embodiments, the sensor 368 includes, or is otherwise embodied as, a proximity sensor, such as a capacitive proximity sensor, an inductive proximity sensor, a hall effect sensor, or the like. Of course, in other embodiments, the sensor 368 may include, or otherwise be embodied as, another suitable sensor.

In the illustrative embodiment, the input devices 710 include a park input 712, a non-park input 714, and a staged state input 716. Each of the inputs 712, 714, 716 is communicatively coupled to the controller 702, at least in some embodiments. The park input 712 includes, or is otherwise embodied as, an input device that may be selected by a user to direct operation of the transmission 120 and the park system 200 in a park operating mode corresponding to the engaged state 400. The park input 714 includes, or is otherwise embodied as, an input device that may be selected by a user to direct operation of the transmission 120 and the park system 200 in a non-park operation mode (e.g., a drive or neutral mode) corresponding to the disengaged state 500. The park input 716 includes, or is otherwise embodied as, an input device that may be selected by a user to direct operation of the transmission 120 and the park system 200 in an operating mode corresponding to the staged state 600.

In some embodiments, the other device(s) 720 include one or more other electrical or electromechanical devices included in the park system 200, the transmission 120, and/or the drive system 100. The device(s) 720 may be incorporated into, or otherwise associated with, the drive unit 102, the torque converter 108, the transmission 120, the gearing system 126, or the electro-hydraulic system 138, as the case may be. For example, the device(s) 720 may include the speed sensors 146, 148, 150, at least in some embodiments. In another example, the device(s) 720 may include the controller 160. Additionally, in some embodiments, the device(s) 720 may include one or more sensors, controllers, solenoids, solenoid valves, and flow control devices, among other things.

Figure 8:
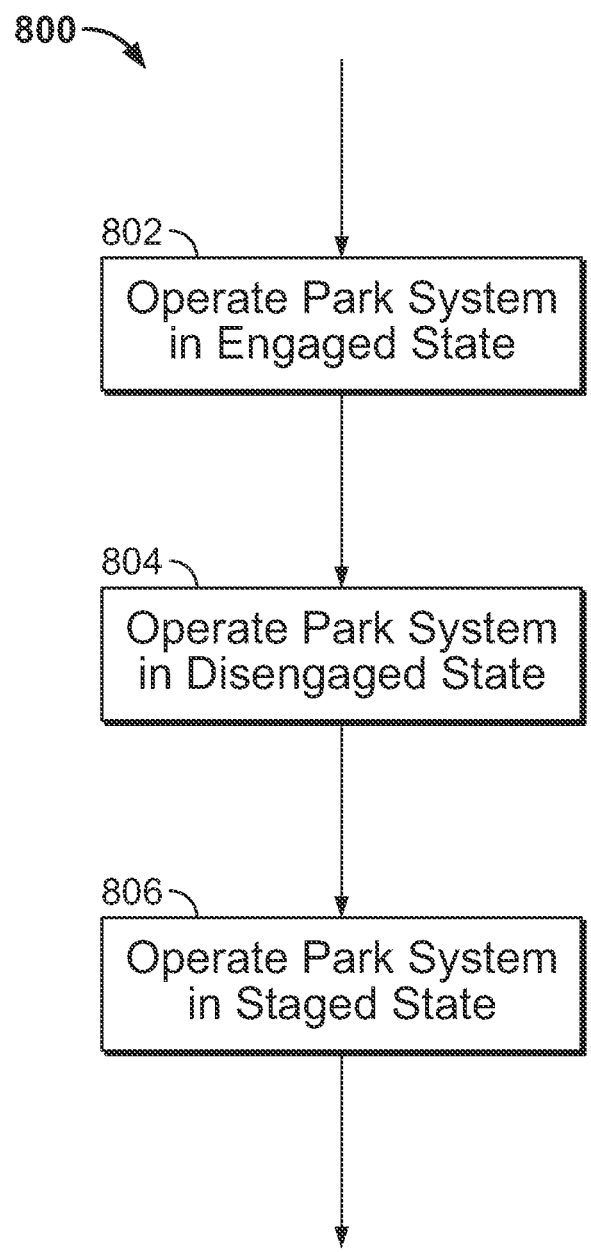
FIG. 8 is a simplified flowchart of a method of operating the transmission shown in FIG. 1.

Referring now to FIG. 8, an illustrative method 800 of operating the transmission 120 may be embodied as, or otherwise include, a set of instructions that are executable by the control system 700. The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 702 operates the transmission 120 and the park system 200 in the engaged state 400. As a result, in block 802, the controller 702 resists rotation of the output shaft 124 using the park actuation assembly 210 of the system 200. In the illustrative embodiment, to perform block 802, the controller 702 performs the method 900 described below with reference to FIG. 9. From block 802, the method 800 proceeds to block 804.

In block 804 of the illustrative method 800, the controller 702 operates the transmission 120 and the park system 200 in the disengaged state 500. Consequently, in block 804, the controller 702 allows rotation of the output shaft 124 using the park actuation assembly 210 of the system 200. In the illustrative embodiment, to perform block 804, the controller 702 performs the method 1000 described below with reference to FIG. 10. From block 804, the method 800 proceeds to block 806.

In block 806 of the illustrative method 800, the controller 702 operates the transmission 120 and the park system 200 in the staged state 600. In doing so, in block 806, the controller 702 transitions the park system 200, and/or stages the park system 200 for a transition, from the staged state 600 to the engaged state 400 in the event of an electrical failure or in the event that the controller 702 receives input to place the transmission 120 and the park system in the engaged state 400. In the illustrative embodiment, to perform block 806, the controller 702 performs the method 1100 described below with reference to FIG. 11.

Figure 9:
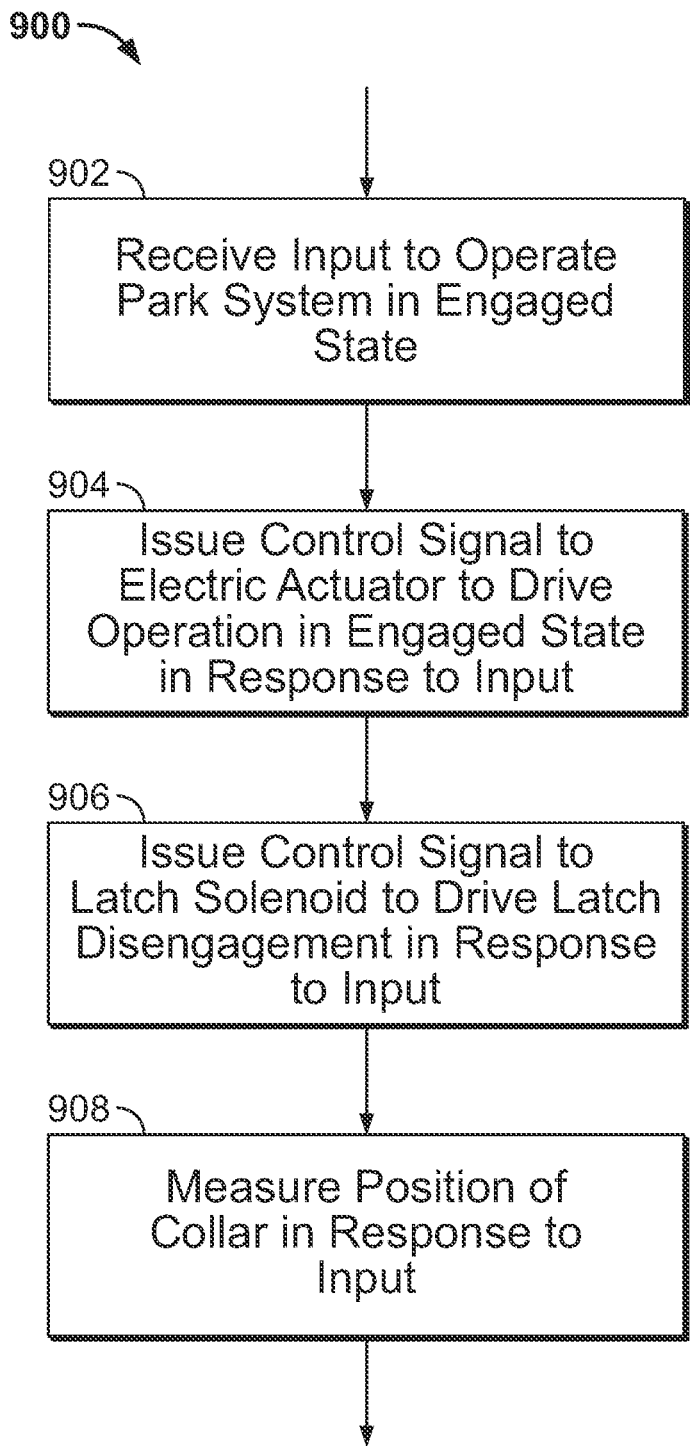
FIG. 9 is a simplified flowchart of a method of performing one of the blocks of the method of FIG. 8.

Referring now to FIG. 9, an illustrative method 900 of operating the transmission 120 and the park system 200 in the engaged state 400 may be embodied as, or otherwise include, a set of instructions that are executable by the control system 700. The method 900 corresponds to, or is otherwise associated with, performance of the blocks described below in the illustrative sequence of FIG. 9. It should be appreciated, however, that the method 900 may be performed in one or more sequences different from the illustrative sequence.

The illustrative method 900 begins with block 902. In block 902, the controller 702 receives input (e.g., from a user) to operate the transmission 120 and the park system 200 in the engaged state 400. For example, in block 902, the controller 702 may receive input from the park input 712. In other embodiments, the controller 702 may receive input from another input device indicative of desired operation in the engaged state 400. From block 902, the method 900 proceeds to block 904.

In block 904 of the illustrative method 900, the controller 702 issues a control signal to the electric actuator 220 to drive operation of the park system 200 in the engaged state 400 in response to the input received in block 902. In some embodiments, performance of block 904 by the controller 702 may include verifying or confirming the correct position of the actuator 220. In such embodiments, performance of block 904 may be based on the In the illustrative embodiment, the control signal issued by the controller 702 in block 904 directs rotation of the actuator 220 to cause rotation of the screw 240 and corresponding translation of the nut 250 along the longitudinal axis 242 in the direction indicated by arrow 402, as discussed above with reference to FIG. 4. From block 904, the method 900 subsequently proceeds to block 906.

In block 906 of the illustrative method 900, the controller 702 issues a control signal to the latch solenoid 258 to drive disengagement of the latch 256 from the collar 290 in response to the input received in block 902. As a result of the control signal issued by the controller 702 in block 906, the latch 256 and the collar 290 are spaced from one another such that translation of the rod 280 and the collar 290 along the longitudinal axis 282 is not constrained by the latch 256. From block 906, the method 900 proceeds to block 908.

In block 908 of the illustrative method 900, the controller 702 measures a position of the collar 290 along the longitudinal axis 282 in response to the input received in block 902. It should be appreciated that measurement is performed in block 908 with, and based on, a position of the collar 290 along the axis 282 that is detected by the sensor 368. In some embodiments, the position measured in block 908 may provide a diagnostic indicator for evaluating operation of the park system 200 in the engaged state 400 in the use of the transmission 120.

Figure 10:
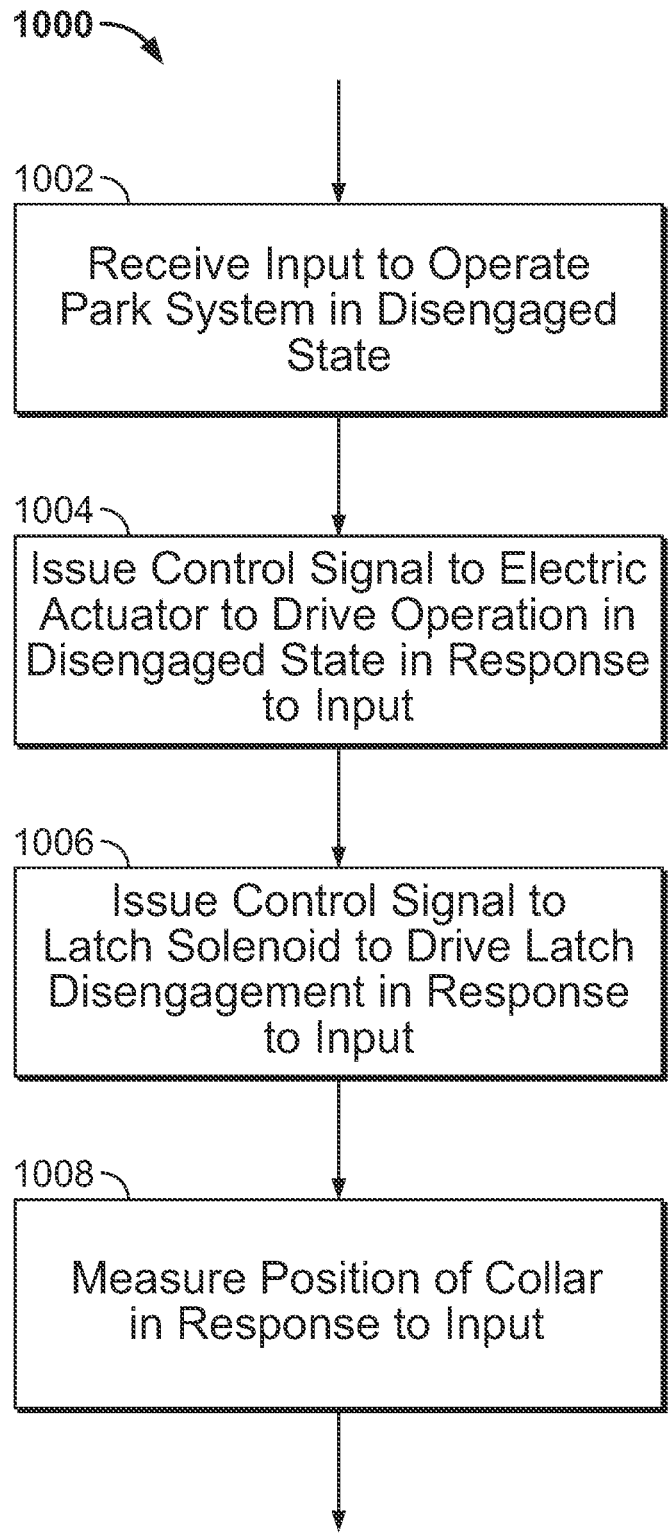
FIG. 10 is a simplified flowchart of a method of performing another one of the blocks of the method of FIG. 8.

Referring now to FIG. 10, an illustrative method 1000 of operating the transmission 120 and the park system 200 in the disengaged state 500 may be embodied as, or otherwise include, a set of instructions that are executable by the control system 700. The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, the controller 702 receives input (e.g., from a user) to operate the transmission 120 and the park system 200 in the disengaged state 500. For example, in block 1002, the controller 702 may receive input from the non-park input 714. In other embodiments, the controller 702 may receive input from another input device indicative of desired operation in the disengaged state 500. From block 1002, the method 1000 proceeds to block 1004.

In block 1004 of the illustrative method 1000, the controller 702 issues a control signal to the electric actuator 220 to drive operation of the park system 200 in the disengaged state 500 in response to the input received in block 1002. In at least some embodiments, the control signal issued by the controller 702 in block 1004 is different from, and/or distinct from, the control signal issued by the controller 702 in block 904. In the illustrative embodiment, the control signal issued by the controller 702 in block 1004 directs rotation of the actuator 220 to cause rotation of the screw 240 and corresponding translation of the nut 250 along the longitudinal axis 242 in the direction indicated by arrow 506, as discussed above with reference to FIG. 5. From block 1004, the method 1000 subsequently proceeds to block 1006.

In block 1006 of the illustrative method 1000, the controller 702 issues a control signal to the latch solenoid 258 to drive disengagement, and/or confirm disengagement, of the latch 256 from the collar 290 in response to the input received in block 1002. In some embodiments, due to disengagement of the latch solenoid 258 in a previous operating state (e.g., a previous park engagement), block 1006 may include maintaining the previous disengaged state of the latch solenoid 258 to effect disengagement of the latch 256 from the collar 290. As a result of the control signal issued by the controller 702 in block 1006, the latch 256 and the collar 290 are spaced from one another such that translation of the rod 280 and the collar 290 along the longitudinal axis 282 is not constrained by the latch 256. In at least some embodiments, the control signal issued by the controller 702 in block 1006 is identical, or substantially identical, to the control signal issued by the controller 702 in block 906. From block 1006, the method 1000 proceeds to block 1008.

In block 1008 of the illustrative method 1000, the controller 702 measures a position of the collar 290 along the longitudinal axis 282 in response to the input received in block 1002. It should be appreciated that measurement is performed in block 1008 with, and based on, a position of the collar 290 along the axis 282 that is detected by the sensor 368. In some embodiments, the position measured in block 1008 may provide a diagnostic indicator for evaluating operation of the park system 200 in the disengaged state 500 in the use of the transmission 120.

Figure 11:
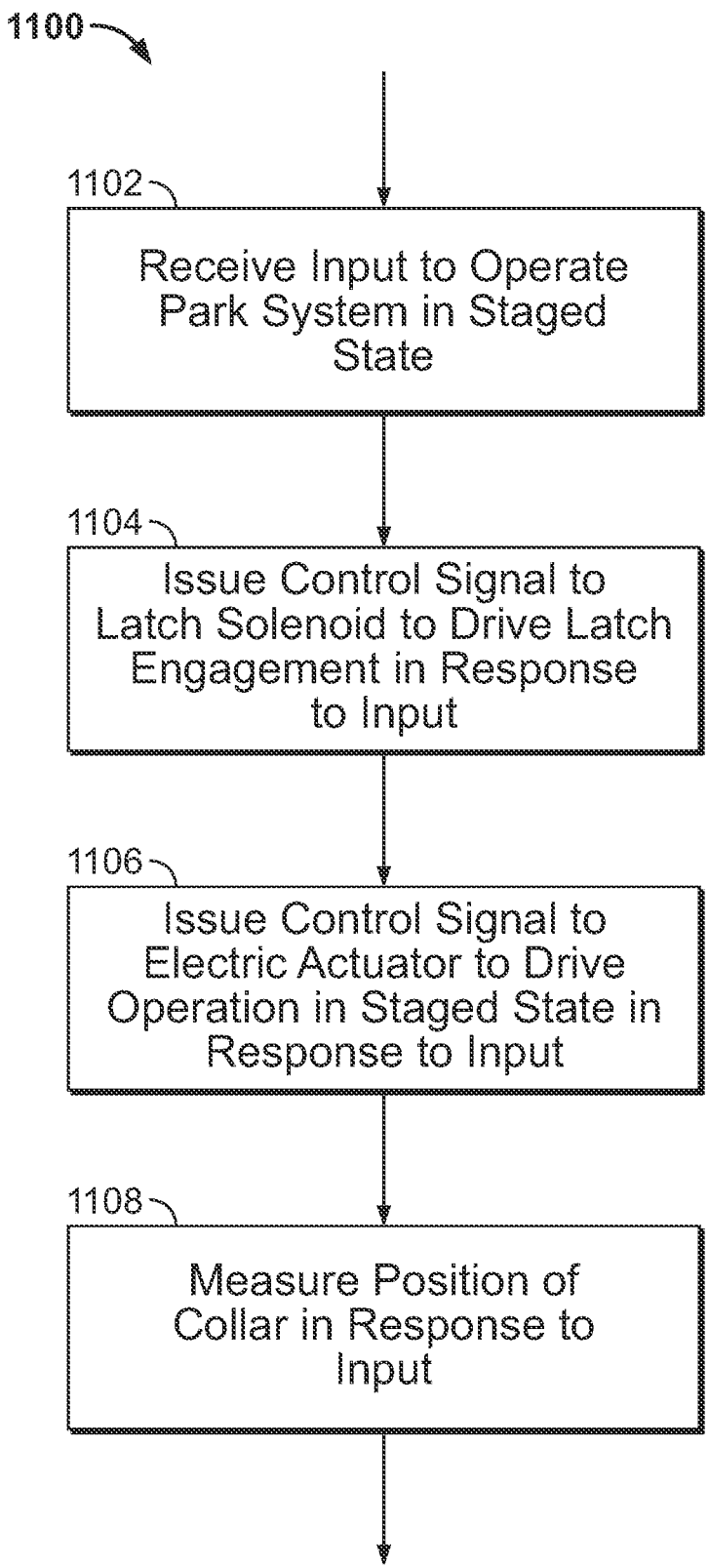
FIG. 11 is a simplified flowchart of a method of performing yet another one of the blocks of the method of FIG. 8.

Referring now to FIG. 11, an illustrative method 1100 of operating the transmission 120 and the park system 200 in the staged state 600 may be embodied as, or otherwise include, a set of instructions that are executable by the control system 700. The method 1100 corresponds to, or is otherwise associated with, performance of the blocks described below in the illustrative sequence of FIG. 11. It should be appreciated, however, that the method 1100 may be performed in one or more sequences different from the illustrative sequence.

The illustrative method 1100 begins with block 1102. In block 1102, the controller 702 receives input (e.g., from a user) to operate the transmission 120 and the park system 200 in the staged state 600. For example, in block 1102, the controller 702 may receive input from the staged state input 716. In other embodiments, the controller 702 may receive input from another input device indicative of desired operation in the staged state 600. From block 1102, the method 1100 proceeds to block 1104.

In block 1104 of the illustrative method 1100, the controller 702 issues a control signal to the latch solenoid 258 to drive extension thereof and engagement of the latch 256 with the collar 290 in response to the input received in block 1102. As a result of the control signal issued by the controller 702 in block 1104, the latch 256 and the collar 290 are in direct contact such that translation of the rod 280 and the collar 290 along the longitudinal axis 282 is constrained by the latch 256, as discussed above with reference to FIG. 6. In at least some embodiments, the control signal issued by the controller 702 in block 1104 is different from, and/or distinct from, each of the control signals issued by the controller 702 in blocks 906 and 1006. From block 1104, the method 1100 proceeds to block 1106.

In block 1106 of the illustrative method 1100, the controller 702 issues a control signal to the electric actuator 220 to drive operation of the park system 200 in the staged state 600 in response to the input received in block 1102. In at least some embodiments, the control signal issued by the controller 702 in block 1106 is different from, and/or distinct from, each of the control signals issued by the controller 702 in blocks 904 and 1004. In the illustrative embodiment, the control signal issued by the controller 702 in block 1106 directs rotation of the screw 240 and corresponding translation of the nut 250 along the longitudinal axis 242 in the direction indicated by arrow 602, as discussed above with reference to FIG. 6. From block 1106, the method 1100 subsequently proceeds to block 1108.

In block 1108 of the illustrative method 1100, the controller 702 measures a position of the collar 290 along the longitudinal axis 282 in response to the input received in block 1102. It should be appreciated that measurement is performed in block 1108 with, and based on, a position of the collar 290 along the axis 282 that is detected by the sensor 368. In some embodiments, the position measured in block 1108 may provide a diagnostic indicator for evaluating operation of the park system 200 in the staged state 600 in the use of the transmission 120.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission comprising:
an input shaft to receive torque from a drive unit;
an output shaft to transmit torque to a load; and
a park system to selectively brake the output shaft, the park system including
a park actuation assembly having a park gear in direct contact with the output shaft,
an actuator, and
an actuation linkage coupled between the actuator and the park actuation assembly to be moved by the actuator,
wherein in use of the transmission, the actuator drives operation of the park actuation assembly through the actuation linkage such that the park system is operable in (i) an engaged state, in which rotation of the park gear is constrained to resist rotation of the output shaft, (ii) a disengaged state, in which rotation of the park gear is permitted to allow rotation of the output shaft, and (iii) a staged state distinct from the engaged state and the disengaged state which facilitates a transition to the engaged state in an event of an electrical failure or when park is selected by an operator, and
wherein the actuation linkage comprises a screw directly coupled to the actuator to be driven by the actuator, a nut or axial cam coupled to the screw for translation along a first longitudinal axis in response to movement of the screw, a lever directly coupled to the nut at one end of the lever, a sleeve directly coupled to the lever at another end of the lever arranged opposite the one end, and a rod supporting the sleeve and adapted for translation along a second longitudinal axis arranged parallel to the first longitudinal axis.

2. The transmission of claim 1, wherein the actuator is an electric actuator.

3. The transmission of claim 2, wherein the actuator drives operation of the park actuation assembly through the actuation linkage without any hydraulically-powered component.

4. The transmission of claim 1, wherein the actuation linkage further comprises a collar affixed to the rod for translation therewith along the second longitudinal axis.

5. The transmission of claim 4, wherein the actuation linkage further comprises a preloaded spring supported by the rod that extends along the second longitudinal axis between the sleeve and a plurality of rollers of the park actuation assembly.

6. The transmission of claim 5, wherein the sleeve is slidable along the second longitudinal axis relative to the rod and is arranged in direct contact with the spring.

7. The transmission of claim 4, wherein the park system further comprises:
a latch; and
a latch solenoid operable to move the latch between (i) a released position, in which the latch is spaced from the collar in each of the engaged state and the disengaged state of the park system, and (ii) a deployed position, in which the latch contacts the collar in the staged state of the park system.

8. The transmission of claim 4, wherein the park system further comprises a sensor to detect a position of the collar along the second longitudinal axis.

9. A park system to selectively brake an output shaft of a transmission, the park system comprising:
a park actuation assembly having a park gear in direct contact with the output shaft,
an electric actuator to supply rotational power, and
an actuation linkage coupled between the electric actuator and the park actuation assembly,
wherein in use of the park system, the electric actuator drives operation of the park actuation assembly through the actuation linkage such that the park system is operable in (i) an engaged state, in which rotation of the park gear is constrained to resist rotation of the output shaft, (ii) a disengaged state, in which rotation of the park gear is permitted to allow rotation of the output shaft, and (iii) a staged state distinct from the engaged state and the disengaged state which facilitates a transition to the engaged state in an event of an electrical failure or when park is selected by an operator,
wherein the actuation linkage comprises a screw directly coupled to the electric actuator to receive rotational power therefrom and a nut threadably locked to the screw for translation along a first longitudinal axis in response to rotation of the screw, and
wherein at least one hanger limits translation of the screw and the nut along the first longitudinal axis and includes an aperture through which the screw extends.

10. The park system of claim 9, wherein the actuation linkage further comprises a sleeve coupled to the nut and supported for slidable movement along a second longitudinal axis spaced from, and arranged parallel to, the first longitudinal axis.

11. The park system of claim 10, wherein translation of the nut along the first longitudinal axis drives translation of the sleeve along the first longitudinal axis.

12. The park system of claim 10, wherein the actuation linkage further comprises a rod supporting the sleeve that is adapted for translation along the second longitudinal axis.

13. The park system of claim 12, wherein the actuation linkage further comprises a collar affixed to the rod for translation therewith along the second longitudinal axis.

14. A park system to selectively brake an output shaft of a transmission, the park system comprising:
a park actuation assembly having a park gear in direct contact with the output shaft,
an electric actuator to supply rotational power, and
an actuation linkage coupled between the electric actuator and the park actuation assembly including a screw directly coupled to the electric actuator to receive rotational power therefrom and a nut threadably locked to the screw for translation along a first longitudinal axis in response to rotation of the screw, wherein a pair of hangers limit translation of the screw and the nut along the first longitudinal axis and each include an aperture through which the screw extends.

15. The park system of claim 14, wherein the actuation linkage comprises a lever directly coupled to the nut at one end of the lever.

16. The park system of claim 15, wherein the actuation linkage comprises a sleeve directly coupled to the lever at another end of the lever opposite the one end.

17. The park system of claim 16, wherein the sleeve is supported for linear translation along a second longitudinal axis spaced from, and parallel to, the first longitudinal axis.

18. The park system of claim 17, wherein the lever extends between the nut and the sleeve at an angle to each of the first and second longitudinal axes.

19. The park system of claim 17, wherein the lever is pivotally mounted to a mounting frame at a location between the first longitudinal axis and the second longitudinal axis in a vertical direction.

20. The park system of claim 19, wherein the pair of hangers extend downwardly in the vertical direction from the location to the first longitudinal axis.

* * * * *